TERMINAL BOX

Filed April 18, 1962 2 Sheets-Sheet 1

INVENTORS
RAYMOND J. BELL
JOHN J. BYRNE
ALBERT J. SCHLUETER

BY [signature]
ATTORNEY

INVENTORS
RAYMOND J. BELL
JOHN J. BYRNE
ALBERT J. SCHLUETER
BY
Spencer E. Olson
ATTORNEY

3,151,923
TERMINAL BOX

Raymond J. Bell, Tonawanda, John J. Byrne, West Seneca, and Albert J. Schlueter, Buffalo, N.Y., assignors to Sylvania Electric Products Inc., a corporation of Delaware Filed Apr. 18, 1962, Ser. No. 188,334
10 Claims. (Cl. 339—18)

This invention relates to means for interconnecting a large number of electrical circuits and more particularly to an improved terminal box structure for use in out-of-office telephone line distribution systems.

In telephone line distribution systems, it is customary to carry several hundred conductor pairs in a single cable from a main office to a selected distribution point where it is tied into a terminal box known in the art as a "B" box. Such boxes normally have several hundred input terminals to which the pairs of wires in the main cable are connected, and several hundred output terminals to which the subscriber telephone line circuits are connected. To connect a new subscriber for telephone service, or to make changes in existing service, appropriate changes are made in the connections between these terminals in the "B" box. Heretofore, this has been accomplished by "jumpers" or eletrical leads.

This type of terminal box, presently in wide commercial use, has a number of disadvantages, not the least of which is the problem of providing a neat and orderly bundle of the jumpers used to make the interconnections. Indeed, in boxes requiring many changes, the jumpers tend to become a mess of snarled wires making it difficult to locate, separate and re-connect any desired jumper. Moreover, the terminals of the box are subject to electrolysis and corrosion due to humidity (the boxes are usually hung on a pole) thus limiting their useful life.

With appreciation of the foregoing and other shortcomings of terminal boxes in current use, applicants have as a primary object of this invention to provide an improved terminal box structure which avoids many of these unfavorable conditions.

Another object is to provide a terminal box for connecting selected input conductors to selected output conductors which does not require the use of jumpers with the result that a neat arrangement is provided at all times and any particular connection can be located and changed in a minimum of time.

Other objects of the invention are to provide a terminal box which is small in size, yet capable of interconnecting a large number of electrical circuits, is economical to manufacture, and which affords protection against moisture and weather to insure long life.

Briefly, the terminal box according to the invention comprises a stacked sandwich of sheets of rigid insulating material, selected ones of the sheets supporting conducting paths arranged in spaced apart planes. The conducting paths in alternate planes in this sandwich are parallel to each other and extend in the same direction, and the paths in the planes sandwiched therebetween are oriented at right angles thereto. Input conductors from the main input cable are connected to conducting paths extending in a first direction and the output lines are connected to conducting paths extending in the right angle direction. The conducting paths are each made up of a pair of parallel connected wires spaced apart a selected distance, the wires defining cross-over points between the input conducting paths and the outgoing conducting paths. The two pairs of wires define a square at each of the cross-over points, and the sandwiched sheets have aligned circular openings at each of the cross-over points of a diameter substantially equal to the diagonal of the square. Selected pairs of wires extending in one direction are connected to selected wires extending in the other direction by a conductive plug having a diameter slightly larger than the spacing between the parallel wires and which is insertable through the openings at the cross-over points. An important feature of the construction is the manner of supporting the wires to allow them to flex upon insertion of the connecting plug, thereby to provide a spring action between the wires and the connecting plug to insure good contact while limiting wear of the plug and wires even with repeated insertion and removal of the plug.

Other objects, features and advantages of the invention, and a better understanding of its construction and operation will be had from the following detailed description taken in conjunction with the accompanying drawings, in which.

Figure 1:
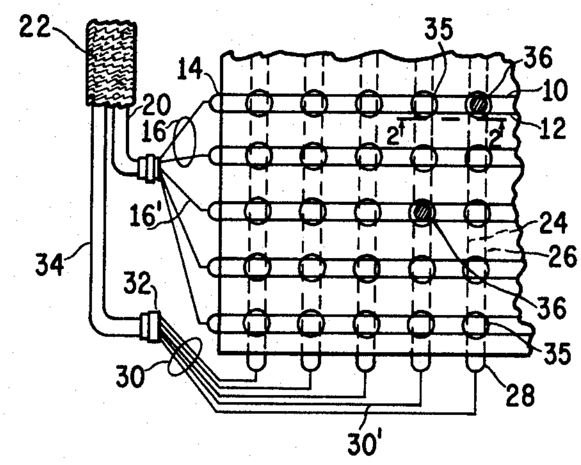
FIG. 1 is a plan view of a fragmentary portion of the cross-connect structure according to the invention.

Referring now to FIG. 1, there is shown a fragmentary plan view of the cross-connect panel which generally illustrates the function of connecting various input conductors to various output conductors. As shown, there are provided a plurality of parallel rows of conducting paths, each of these paths being formed by a first pair of wires indicated at 10 and 12. The ends of each pair of wires such as 10 and 12 are connected together at 14 and are connected by leads 16 to a connector plug 18, in turn connected to an input cable 20 from the main cable 22.

Similarly, in a second plane spaced from the plane of the first set of wires by a sheet of insulating material are a plurality of parallel columns of conducting paths, each column being defined by a second pair of wires such as indicated at 24 and 26 extending beneath and at right angles to the rows. The wires in each column pair are connected together at their ends as shown at 28, the wires of each row being connected by respective leads 30 to a connector plug 32 to a main output cable 34 within the main cable sheath 22.

At each of the cross-over points of the rows and columns circular openings 35 extend through the sandwich of insulative sheets, the diameter of the openings being approximately equal to the diagonal of the square formed by the row and column wire pairs at the point of cross-over. The square-shaped openings defined by the wires receive connecting means in the form of a cylindrical plug 36 having a conductive portion of a length slightly greater than the separation between the planes of the row and column wires. To effect connection between one of the input conductors such as the lead 16′ with one of the output conductors such as lead 30′, the plug is inserted at the cross-over opening defined by the respective row and column to which these leads are respectively connected.

While the discussion thus far has considered the location of crossed wires in but two planes, in the application of a "B" box in telephony, at least two sets of rows and two sets of columns of conducting paths are required to provide for both tip and ring connections. Thus beneath the dotted line column in FIG. 1 there would be an additional set of wires constituting rows and beneath them and spaced therefrom would be additional wires constituting columns. The wires in all four planes are aligned such that all cross-overs are located centrally of corresponding openings in the insulative sheets.

This multiple-plane structure is illustrated in the fragmentary cross-sectional view of FIG. 2 wherein the first pair of wires are shown at 12, the wire 10 being disposed behind the wire 12 as viewed in this figure, and the wires 24 and 26 of the column are in a plane below the wires 10 and 12. The additional rows of pairs of wires lie in a plane spaced below the plane of wires 24 and 26 as at 38, with a similar wire behind the conductor 38, and the additional columns are shown at 40 and 42 extending at right angles to the rows and in a plane spaced below the plane of wire 38. As mentioned, when viewed in plan the cross-overs of the rows and columns appear as vertically aligned squares so that single plug 36 extending through the squares may make connection between the upper rows and columns and the lower rows and columns.

Figure 3:
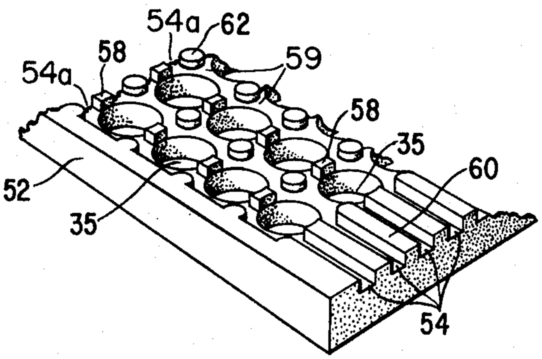
FIG. 3 is a fragmentary perspective view of one of the insulative sheets of the cross-connecting structure, illustrating a preferred embodiment for guiding the parallel wires.
Figure 4:
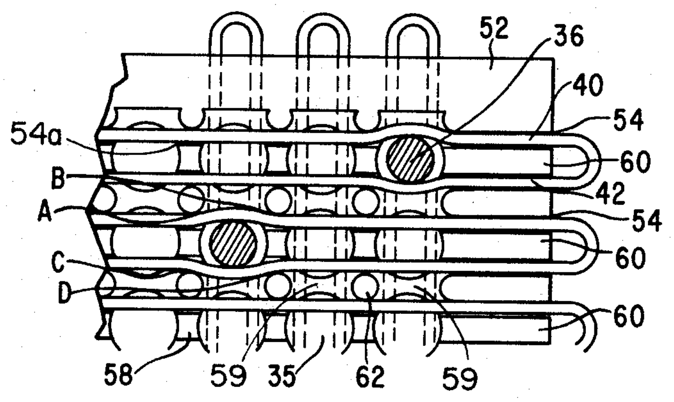
FIG. 4 is a greatly enlarged fragmentary portion of the cross-connecting structure illustrating how the design of FIG. 3 insures secure contact between the connecting plug and the pair of wires.

Essential to the proper positioning and support of the wires at the points of cross-over to insure good contact between the plug and the wires is the design of the in sulative sheets of the sandwiched panel. As shown in FIG. 2, a four-plane panel consists of five sheets 44, 46, 48, 50 and 52 formed of suitable moldable insulating material, for example, phenolic plastic. The central sheet 48 may be thicker than the others, as illustrated, and both of its surfaces are flat and smooth. The other four sheets are essentially identical, each having a smooth surface on one side and formed with a waffle-like array of bosses on the other side. As shown in FIGS. 3 and 4, these bosses are arranged to define grooves for positioning the wire pairs of the rows and columns. In the assembly of FIG. 2, the grooved surface of plate 44 cooperates with the upper smooth surface of plate 46 to hold the upper row wires 12 in place, and the lower grooved surface of plate 46 together with the upper smooth surface of central sheet 48 positions the upper column wires 24 and 26. Similarly, sheet 50 has its grooved side facing upwardly and together with the smooth lower surface of sheet 48 positions the lower row wires 38, and plate 52, also having its grooved surface directed upwardly engages the smooth surface of sheet 50 to support the lower column wires 40 and 42. The stack of sheets, which may be of relatively large area, are firmly held together with screws or bolts (not shown) suitably distributed about the periphery and, if necessary, the central area of the panel, to prevent any tendency toward warping of the sheets.

With particular reference now to FIGS. 3 and 4, extending inwardly from one edge of each of the embossed sheets are a plurality of evenly spaced grooves 54 of substantially square cross-section having depth and width dimensions slightly larger than the diameter of wires 10, 12, 24, etc. The spacing between grooves is slightly less than the diameter of openings 35 so that when wires 40 and 42 are laid in the grooves they extend across the openings 35 and lie at least partially within the area thereof as shown in FIG. 4. Co-linear extensions of the grooves 54, indicated at 54*a*, for positioning the rest of the length of the wires, are defined by a regular pattern of bosses of a height equal to the depth of grooves 54. Half of the bosses are of generally rectangular shape, indicated at 58, these being aligned with and in effect constituting an extension of the ridge 60 between grooves 54. The bosses 58 occupy the full space between the openings 35 to the extent that the edges thereof which confront the adjacent openings are a vertical extension of the walls of the openings. That is, the concave surfaces of the bosses 58 have the same radius of curvature as the openings 35. The other two edges of bosses 58 are straight and are aligned with the edges of ridge 60. It will be noted that the inner end of ridge 60 also has a curvature corresponding to that of the opening adjacent thereto.

It will be seen from the description thus far that the width of bosses 58 will limit the extent to which the wires pass over the area of the openings; the circular bosses 62 positioned between the rectangular bosses and aligned therewith in a direction at right angles to the length dimension of grooves 54*a* limit the degree of movement of the wires in the other direction, and defines cross slots 59 into which the wires may be flexed upon insertion of pin 36, as will be more fully described hereinafter. The diameter of the circular bosses is chosen to provide a space between the circular and rectangular bosses slightly larger than the diameter of the wire; that is, a spacing corresponding to the width of grooves 54. As illustrated along the lower lefthand edge of the sheet in FIG. 3, and along the upper edge in FIG. 4, the bosses are of semi-circular configuration, and the inner ends of the ridges which are aligned with the circular bosses have a convex curvature as shown.

As mentioned earlier, sheets 44, 46, 50 and 52 are of the same configuration, the layout of the edge grooves being such that the openings 35 are aligned vertically when the sheets are assembled with the grooves at right angles to each other. In other words, sheet 52 may be assembled with the grooves 54 and their continuations 54*a* extending in one direction, and the sheet 50 assembled therewith with the grooves 54 extending at right angles to said one direction. Similarly, the grooves in sheet 46 are parallel to the grooves in sheet 52, and the grooves in sheet 44 are at right angles thereto.

The described construction permits assembly of the sandwich of insulating sheets prior to inserting the wires. The paired wires, such as 40 and 42, electrically connected together, are conveniently provided by preforming a length of wire into a long hairpin shape, the free ends of which are inserted into the open ends of the slots 54. The free ends of the wires are initially guided by slots 54 and upon further insertion are guided without interference by the bosses 58 and 62. The curvature of the closed end of the loop is so chosen that when the loop is fully inserted to extend across the width of the panel there is sufficient spring action of the wire against the sides of the slots 54 to firmly hold the wires in place. In addition to avoiding the necessity for other means of keeping the wire in place, the loop at the end of the wire pairs provide the end connections 14 and 28 referred to in FIG. 1, to which leads 16 and 30 may be directly connected.

It will be apparent from the foregoing that the wires in the assembled panel lie rather loosely between the bosses 58 and 62, crossing over the openings 56 and defining squares which are circumscribed by the circular openings. It is to be noted, however, that while the inside surface of the wires are engaged by the rectangular bosses 58 approximately at the corners of the squares, the outer surface of the wires are engaged by the circular bosses 62 at points of contact considerably removed from the corners of the square. More specifically, with reference to FIG. 4, and considering the cross-over point appearing near the center of the illustration, the upper wire of the pair makes point contact with a pair of circular bosses at points A and B, and the lower wire makes point contact with another pair of circular bosses at points C and D, all four of these points being spaced an appreciable distance from the corresponding corners of the square formed by the wires shown in full line and the pair of wires beneath it shown in dotted line. This feature is significant in that when a conducting plug 36 of a diameter slightly larger than the dimensions of the square is inserted in the square openings, the wire is allowed to bow slightly between the spaced contact points, into the cross slot 59, the resulting spring action of the wire insuring good contact with the plug and securely holding it in place. This slight yieldability of the wires also contributes to wear-resistance in that room is made for the plug by flexure of the wires rather than by abrasion. Thus, even with repeated insertion and removal, the wires are not damaged, and although there may be some squaring of the plug, it can be readily replaced. The important thing is that the cross-connect panel itself is very durable and long-lasting.

Returning now to FIG. 2, it will be noted that the inserted plug 36 has a cylindrical shank portion consisting of a conducting portion 70, a central insulating portion 72 and a second conducting portion 74 terminating in an insulating tip 76. The central insulating portion separates the two conducting portions. With the plug inserted as shown, the row consisting of wires 10 and 12 in the first plane will be electrically connected by the conducting portion 70 to the wires 24 and 26 defining a column in the next plane. Similarly, the additional pair of wires, one of which is shown at 38, will be connected to the column pair of wires 40 and 42 in the lowermost plane by the second conducting portion 74. The length of the central insulating section 72 of the plug is slightly greater than the length of the two conducting portions 70 and 74, and the conducting portions each have a length which is slightly greater than the spacing between adjacent rows and columns of conducting wire pairs, insuring a break-before-make contact when inserting or removing the plug. That is, as the plug is being inserted, the lower conducting portion 74 will be moved out of contact with the column wires 24 and 26 before its lower end engages the next row pair of wires, one of which is indicated at 38. The same situation obtains when the plug is removed, thus avoiding any inadvertent short circuiting between wires of the two groups.

Figure 2:
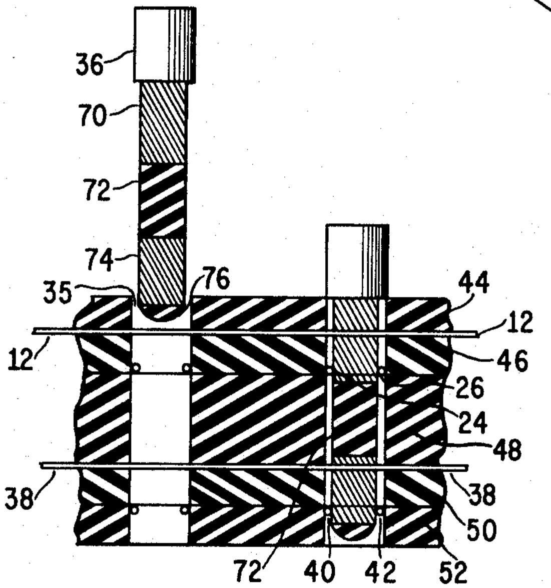
FIG. 2 is an enlarged fragmentary cross section taken partly in the direction of the arrows 2—2 of FIG. 1.

Although there has been shown in FIG. 2 a panel having provision for cross-connecting two circuits, the design of the waffle-like sheets permits the convenient stacking of sufficient additional sheets, in the same assembly, to provide two additional circuits identical with those illustrated. The additional circuits would, however, be cross-connected with plugs inserted from the opposite side of the panel.

Figure 6:
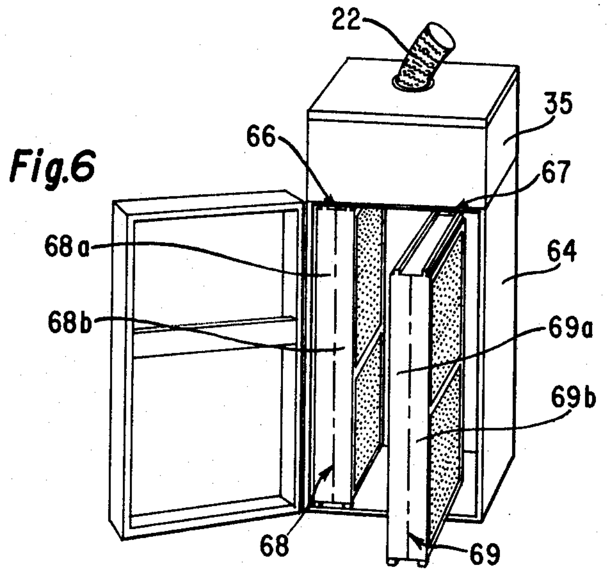
FIG. 6 is a perspective view illustrating the manner in which the present cross-connecting structure is supported in a terminal box.

The described construction is very compact, and provides a very large number of cross-connecting points in a relatively small area. For example, in an assembly which has been constructed and successfully used a 50 x 50 grid of openings 35 having a diameter of ⅛ inch is arranged in a 10 inch square giving 2500 cross-connect points. The thickness of the sandwich (FIG. 2) is less than ¾ inch. The structure is conveniently enclosed in a housing 64 of the configuration shown in FIG. 6 which includes a top enclosure 65 receiving a main cable 22 which includes both input and output lines. On the front face of the box 64 are two channels 66 and 67 for receiving a pair of cross-connect panels 68 and 69 vertically positioned and mounted on rails so that they may be pulled out of the channels to expose both sides as shown for the panel 69. The panels are illustrated as being double sided, with plugs extending from each side, readily accessible for effecting a desired connection or disconnection.

Figure 5:
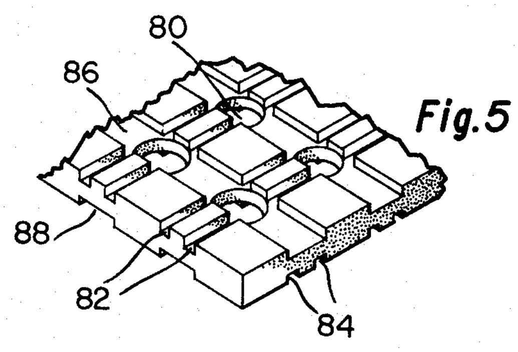
FIG. 5 is a fragmentary perspective view illustrating another design for supporting the wires.

FIG. 5 shows an alternate sheet construction for guiding and supporting the paired wires. The sheet, as before, may be formed of a suitable insulating material, preferably molded, and provided with a plurality of circular openings 80 arranged in a rectangular grid pattern as shown. The sheet has spaced wire-receiving grooves 82 and 84 on opposite surfaces thereof, so dimensioned that the wires fit loosely in the grooves. As shown, the grooves 82 in the upper surface are arranged at right angles to the grooves 84 in the under surface, both being so arranged with respect to the openings 80 that wires laid in the grooves cross the openings at diametrically opposite sides just inside of being tangent to the perimeter of the openings. Thus, the crossing over of the wires in grooves 82 and the wires in grooves 84 define square-shaped openings which are essentially circumscribed by the circular holes. When a plurality of the sheets are sandwiched together, in a manner similar to that shown in FIG. 2, these squares are aligned vertically so that a single plug may effect connection between row and column wire pairs.

To provide room for the wires to flex when the plug is inserted, cross slots 86 and 88 are provided in both surfaces of the sheet, at right angles to their respective wire-receiving grooves 82 and 84. These slots have a width slightly less than the diameter of openings 80 and are centered over the openings such that the sides of the groove are just inside of being tangent to the perimeter of the openings. It will be apparent that the result achieved by this configuration is very similar to that illustrated in FIG. 4; that is, the wires are engaged at points of contact spaced from the corners of the square defined by the wires at the cross-over points, the cross-slots affording room into which the wires can bow or flex when the plug is inserted.

Sheets of the type illustrated in FIG. 5 are stacked with perforated sheets that are smooth on both sides, the complete panel being very similar in cross-section to that shown in FIG. 2. A single sheet, grooved on both sides, and sandwiched between two smooth sheets would support the upper rows and columns, and a second grooved sheet, sandwiched between two other smooth sheets (one of which may be common with the first) would support the lower row and column wires. The wires may be of long hairpin shape, as shown in FIG. 4, and inserted after the sheets are assembled.

From the foregoing description, it will be seen that the present invention has provided a greatly improved terminal box structure, more compact than conventional "B" boxes, and simple to install and service. The loose fit of the wires in the guide slots allow different rates of thermal expansion of the wires and sheet material, and the cross-slots permit flexure of the wires upon insertion of the cross-connecting plugs, insuring good contact and contributing to a longer life.

Although there has been described what are now considered to be preferred embodiments of the invention, modifications that fall within the scope and spirit of the invention will occur to those skilled in the art. It is therefore to be understood that the invention is not to be limited to the exact embodiments and applications illustrated and described except as such limitations appear in the appended claims.

What is claimed is:

1. A terminal board for connecting selected input conductors to selected output conductors comprising, a plurality of stacked sheets of insulating material having a plurality of circular openings arranged in a grid pattern and extending normally through the stack, at least one of said sheets having a first plurality of pairs of parallel grooves in a surface thereof, the grooves of said pairs being spaced apart a distance less than the diameter of said openings and extending across said circular openings in a first direction, another surface of at least one of said sheets having a second plurality of pairs of like grooves formed therein extending across said openings at right angles to said first direction, first pairs of wires supported in corresponding pairs of those grooves extending in said one direction and connected to said input conductors, second pairs of wires supported in corresponding pairs of said grooves extending at right angles to said first direction and connected to said output conductors, said first and second pairs of wires lying in spaced apart parallel planes, those sheet surfaces containing said grooves also having cross slots therein arranged at right angles to their respective grooves and extending over said circular openings, the width of said cross slots being substantially equal to the space between said spaced apart grooves, and a cylindrical connecting plug having a diameter slightly greater than the spacing between the grooves of said pairs adapted to be received in said openings and to extend normally through at least a portion of said stack to connect a wire pair extending in said one direction with a wire pair extending at right angles to said one direction.

2. A terminal board for connecting selected input conductors to selected output conductors comprising, a plurality of parallel rows of first pairs of wires lying in a first plane and connected to respective ones of said input conductors, a plurality of parallel columns of second pairs of wires lying in a second plane spaced from and parallel to said first plane and connected to respective ones of said output conductors, said columns crossing said rows at right angles, stacked sheets of insulation material having a plurality of parallel rows and columns of first and second pairs of spaced apart grooves in selected surfaces thereof respectively supporting the first and second pairs of wires of said rows and columns in fixed relationship in said first and second planes, said grooves being arranged so that said first and second pairs of wires define square cross-over openings, said stacked sheets having a plurality of apertures extending normally therethrough and aligned with said cross-over openings, said sheets of insulation material further having a plurality of first and second cross slots respectively lying in said first and second planes and extending at right angles to and intersecting said first and second pairs of spaced apart grooves, respectively, over said apertures, the width of said cross slots being substantially equal to the space between said spaced apart grooves, and a removable conductive plug having cross-sectional dimensions greater than the spaces between said wires whereby insertion of said plug through a square cross-over opening flexes the sides of said square opening into said cross slots.

3. A terminal board according to claim 2 in which said first and second pairs of spaced apart grooves are respectively formed in one surface of different ones of said stacked sheets of insulation material.

4. A terminal board according to claim 2 in which said first and second pairs of spaced apart grooves are respectively formed in opposite surfaces of one of said stacked sheets of insulation material.

5. A terminal board for connecting selected input conductors to selected output conductors comprising, a plurality of stacked sheets of insulating material, selected ones of which have a plurality of first pairs of spaced parallel grooves therein extending in a first direction, other ones of said sheets having a plurality of second pairs of like spaced parallel grooves therein extending at right angles to said first direction, said first and second pairs of grooves lying in spaced apart parallel planes, said grooved sheets each further having a plurality of cross slots therein of a width substantially equal to the spacing between the grooves of said pairs and extending at right angles to the spaced grooves therein, said stacked sheets having circular openings therethrough at the intersections of said spaced and cross grooves of a diameter slightly larger than the width of said cross slots, first pairs of wires loosely supported in said first pairs of grooves and connected to said input conductors, second pairs of wires loosely supported in said second pairs of grooves and connected to said output conductors, said first and second pairs of wires defining square cross-over openings centrally located within corresponding circular openings, and a cylindrical conductive plug of diameter greater than the spaces between said wires whereby insertion of said plug through said square cross-over opening flexes the sides of said square opening into said cross slots to frictionally retain said plug in position and connect said first pairs of wires to said second pair of wires.

6. A terminal board according to claim 5 in which the spacing of said spaced parallel grooves is determined by an array of substantially rectangular bosses extending in the direction of said rows and aligned with a row of said circular openings, the other edges of the grooves of a pair being defined by two arrays of substantially circular bosses disposed on either side of said array of rectangular bosses and extending parallel thereto.

7. A terminal board for connecting selected input conductors to selected output conductors comprising, a plurality of stacked sheets of insulating material at least one of which has a plurality of first pairs of spaced parallel grooves in one surface thereof extending in a first direction and a plurality of second pairs of spaced parallel grooves in the other surface thereof and extending at right angles to said first direction, said one sheet further having cross slots in both surfaces thereof extending at right angles to its corresponding spaced grooves, said cross slots having a width substantially equal to the separation distance of said spaced grooves, said stacked sheets having circular openings therethrough at the intersections of said spaced grooves and cross slots of a diameter slightly larger than the width of said cross slots, first pairs of wires having a diameter smaller than the width of said spaced grooves supported in said first pairs of spaced grooves and connected to respective input conductors, second pairs of similar wires supported in said second pairs of spaced grooves and connected to respective output conductors, said first and second pairs of wires defining square crossover openings centrally located within corresponding circular openings, and a cylindrical conducting plug of diameter greater than the spaces between said wires whereby insertion of said plug through a square cross-over opening flexes the sides of said square opening into their associated cross slots to frictionally retain said plug in position and connect a first pair of wires to a second pair of wires.

8. In a terminal board for connecting any one of a first plurality of input conductors to any one of a second plurality of output conductors, first and second contoured surfaces of electrical insulating material, each including a plurality of circular holes of substantially uniform diameter arranged in a coordinate pattern of rows and columns, a plurality of substantially circular protuberances, each projecting from the plane of said surface in a location substantially central of a group of four of said holes and each being so dimensioned that a straight wire lying against an array of said protuberances extending in one of said coordinate directions will have one side thereof tangent to the circumference of at least a pair of said protuberances and its other side secant to a circular hole intermediate said pair of protuberances, said surfaces being arranged in spaced apart planes with the circular holes of said two surfaces in registration, a plurality of wires supported by each of said surfaces, each of said wires lying in a flexible condition with respect to said surface with one side tangent to a plurality of said protuberances and its other side secant to a plurality of said holes, the wires supported against one of said surfaces extending in a first direction and the wires supported against the other of said surfaces extending in a second direction at right angles to said first direction.

9. A terminal board according to claim 8 wherein a circular plug having an area of electrically conductive material on its surface is inserted in one of said holes, said plug having its conductive area in physical and electrical contact with at least one each of the wires extending in said first and second directions, said contacted conductors being held in a stressed condition by being forced by said plug against a pair of said protuberances.

10. The invention according to claim 9 wherein each of said contoured surfaces has, in addition to said circular protuberances, a plurality of additional protuberances located in an area between adjacent holes and each having first and second substantially flat surfaces arranged to bear against adjacent ones of said wires to keep them separated from each other.

References Cited in the file of this patent

UNITED STATES PATENTS

| | | |
|---|---|---|
| 261,187 | Vail | July 18, 1882 |
| 840,537 | Weir | Jan. 8, 1907 |
| 1,283,563 | Roberts | Nov. 5, 1918 |
| 2,747,144 | Beers | May 22, 1956 |

FOREIGN PATENTS

| | | |
|---|---|---|
| 940,415 | Germany | Mar. 15, 1956 |